United States Patent [19]

Gobien et al.

[11] Patent Number: 4,658,763
[45] Date of Patent: Apr. 21, 1987

[54] LIQUID-COOLED FOUR-VALVE CYLINDER HEAD FOR A MULTI-CYLINDER INTERNALCOMBUSTION ENGINE

[75] Inventors: Ernst Gobien, Weinstadt; Gerhard Haussmann, Leinfelden; Edgar Bruetsch, Stuttgart, all of Fed. Rep. of Germany

[73] Assignee: Daimler-Benz Aktiengesellschaft, Fed. Rep. of Germany

[21] Appl. No.: 851,815

[22] Filed: Apr. 14, 1986

[30] Foreign Application Priority Data

Apr. 12, 1985 [DE] Fed. Rep. of Germany ....... 3513126

[51] Int. Cl.$^4$ .............................................. F01P 3/02
[52] U.S. Cl. ........................ 123/41.82 R; 123/193 H
[58] Field of Search .......... 123/41.72, 41.74, 41.82 R, 123/193 H

[56] References Cited

U.S. PATENT DOCUMENTS 2,957,460  10/1960  Kolbe ............................... 123/41.74
4,530,323  7/1985  Wakasa ......................... 123/41.82 R
4,567,859  2/1986  Tagwchi et al. ............. 123/41.82 R Primary Examiner—William A. Cuchlinski, Jr.
Attorney, Agent, or Firm—Barnes & Thornburg

[57] ABSTRACT

A liquid-cooled cylinder head is provided for an internal-combustion engine having a water space reaching from the cylinder head bottom to a cylinder head ceiling and having a control space located above it. Supporting walls extend in the cooling water space transversely between sections of the cylinder head bottom on the side of the combustion chamber. For reinforcement of the cylinder head housing, a longitudinal rib is provided in the water space within the cylinder head ceiling. In the planes of the supporting walls, rib webs are provided that overlap into sections of the cooling water space that are adjacent the combustion chamber. In the control space, a crossconnection is provided consisting of longitudinally and transversely extending ribs. The resultant cylinder head exhibits a reinforced structure having superior resistance to applied force.

16 Claims, 5 Drawing Figures

LIQUID-COOLED FOUR-VALVE CYLINDER HEAD FOR A MULTI-CYLINDER INTERNALCOMBUSTION ENGINE

BACKGROUND AND SUMMARY OF THE INVENTION

This invention relates generally to a liquid-cooled four-valve cylinder head for a multi-cylinder internal-combustion engine.

In the case of a known cylinder head as disclosed in German DE-AS No. 24 20 051, the cylinder head bottom is supported essentially only by the transversely extending supporting walls from the cylinder head ceiling. As a result, critical stress conditions occur in the combustion chamber sections and particularly in the valve webs because of high gas pressures as well as high combustion temperatures, that may lead to web breaks and deflections of the cylinder head bottom. An additional fact is that the forces of pressure from the cylinder head screws are introduced into the cylinder head bottom only by the supporting walls. This makes it impossible to favorably distribute the pressure forces to other cylinder head walls and to evenly press the cylinder head to the cylinder housing.

An objective of the present invention is the provision of a cylinder head having a simple construction as far as casting practice is concerned which exhibits better rigidity and strength of the head.

Another objective is to provide a better reinforcement of the sections of the cylinder head bottom on the side of the combustion chamber.

An even further objective is to achieve a good distribution of the forces of pressure introduced into the bottom.

These and other objectives of the present invention are attained by the provision of a cylinder head for a multi-cylinder internal-combustion engine having a cooling water space delimited by lateral exterior walls, a cylinder head bottom and a cylinder head ceiling located at a position above the cylinder head bottom. A control space located above the cylinder head ceiling is delimited by the cylinder head ceiling, the exterior walls and a cover-separating plane. Valve ducts project into the cooling water space and lead away from mouth openings in the cylinder head bottom to the lateral exterior walls. A tube-shaped chamber for a spark plug or an injection nozzle extends between the valve ducts through the cooling water space axially to the cylinder. Supporting walls extend inside the cooling water space in a transverse direction between the combustion chamber sections of the cylinder head bottom and extend from the cylinder head bottom and extend from the cylinder head bottom to the cylinder head ceiling. The supporting walls are provided with molded-in supporting columns for bores which receive the cylinder head screws. A longitudinal rib provided as part of the cylinder head ceiling extends over the length of the cylinder head and is interconnected with the tube-shaped chambers and the supporting walls. The supporting walls are further supported at the cylinder head bottom by longitudinally extending rib webs which overlap into adjacent combustion chamber sections.

By means of the longitudinal rib in the cylinder head ceiling and its connecting to the tube-shaped chamber of the spark plug, a reinforcement of the cylinder head is achieved, particularly with respect to the bottom sections on the side of the combustion chamber. In connection with the rib webs, a favorable distribution is obtained in this case of the tension forces introduced by the tightening screws by the supporting columns into the cylinder head bottom and of the gas forces affecting the bottom section of the combustion chamber. On the one hand, these are absorbed by the chambers and the longitudinal rib and, on the other hand, by the rib webs and the supporting walls connected with them, achieving a rigid connection between the cylinder head bottom and ceiling. As a result, an even engagement of the cylinder head against the cylinder block is attained.

In a further advantageous development of the present invention, the cylinder head ceiling consists of two ceiling sections extending in a longitudinal direction relative to the cylinder head. These two ceiling sections interconnect with the longitudinal rib and are connected with the rib at different vertical points on the rib.

In another advantageous embodiment of the invention, one ceiling section slopes downward from the exterior wall toward the longitudinal rib and interconnects with the longitudinal rib at the bottom portion of the rib. The other ceiling section has a slope essentially equal to that of the first section and interconnects with the longitudinally extending rib at a top portion of the rib.

By means of these advantageous developments, the longitudinal rib can be integrated into the ceiling sections of the cylinder head ceiling in such a way that it has a smooth surface on both sides. The "step" that in the process is formed by the longitudinal rib will by no means interfere with the lubricating-oil return flow from the control space or the water flow in the water space because the oil drain from the control space as well as the cooling-water feeding into the water space in each case takes place via corresponding openings in the ceiling section that is located at a lower level. By means of a course of the ceiling sections that, on the whole, rises continuously, vapor bubbles can completely be discharged from the water space via the outlet openings arranged in the area of the ceiling section that is located at a higher level.

In another advantageous development of the present invention, the cylinder head ceiling, when installed in the engine, advantageously has an approximately horizontal orientation.

In another advantageous development of the present invention, the valves of the internal combustion engine are disposed in a V-shape and arranged in two rows on both sides diagonally to the central longitudinal plane. Two cam shafts are located approximately in the planes of the two valve rows of both the valves. These cam shafts are disposed in bearing seats molded into the external surface of the control space on each side of the central plane. The bearing seats are arranged in the vertical transverse plane of the supporting walls and the dividing plane of the bearing seats is coplanar with the cover-separating plane. Supporting columns extending to the cover-separating plane together with transverse connecting webs extending between the supporting columns combine to form a transverse interconnecting support structure. It is also contemplated that the transverse interconnecting support structure be reinforced by at least one rib extending in the direction of the longitudinal axis of the cylinder and interconnected with the tube-shaped chamber.

By means of this advantageous construction, especially in the case of a cylinder head having two rows of valves extending in a V-shape with respect to one another and two camshafts disposed in the control space, an increased rigidity of the control space area is achieved in addition to the desired increased rigidity of the cylinder head bottom.

In another advantageous of the present invention, the supporting walls are provided with break-throughs on both sides of the supporting columns. By means of these break-throughs, in addition to an unhindered distribution of the respective liquids in the longitudinal direction of the cylinder head, a favorable design of the water and oil cores is achieved with respect to casting and functional aspects.

Further objects, features, and advantages of the present invention will become more apparent from the following description when taken with the accompanying drawings which show, for purposes of illustration only, and embodiments in accordance with the present invention.

DETAILED DESCRIPTION OF THE DRAWINGS

Figure 1:
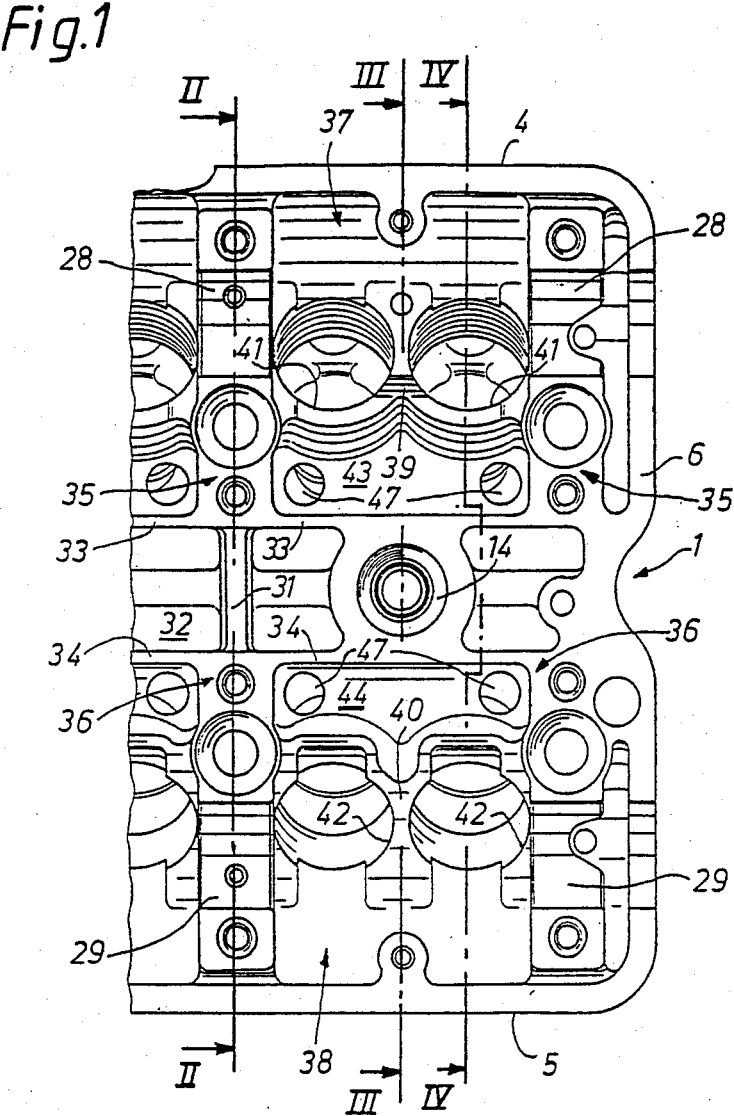
FIG. 1 is a partial top view of a cylinder head in accordance with the present invention.

A cylinder head 1 for a multi-cylinder four-cycle internal-combustion engine comprises a one-piece casting having a cylinder head bottom 2 and exterior walls 6 on the front side and exterior walls 4, 5 on the longitudinal side starting from said cylinder head bottom 2 in upward direction to a cover-separating plane 3. Together with the cylinder head bottom 2, the exterior walls 4, 5 and 6 enclose a space which, by means of a cylinder head ceiling 7 arranged at a distance from the cylinder head bottom 2, is divided into a cooling-water space 8 and a control space 9 located above it reaching to the cover-separating plane 3. Valve throats 10 and 11 extending transversely to the longitudinal direction of the cylinder head project into the cooling-water space 8 that is jointed per se, said valve throats 10 and 11 extending from mouth openings 12, 13 in the cylinder head bottom 2 to the exterior walls 4, 5 on the longitudinal side.

Between the valve throats 10, 11, a chamber 14 is located for the insertion of a spark plug or an injection nozzle that extends axially from the cover-separating plane 3, through the control space 9 and the cooling-water space 8 and leads out, approximately in the center, into a combustion chamber 15 of a cylinder. Between the individual combustion chambers 15 of the cylinders, supporting walls 16 extend that reach from the cylinder head bottom 2 to the cylinder head ceiling 7 and extend transversely.

Within these walls, supporting columns 17 are formed that are provided with continuous bores for receiving cylinder head screws. The means of the cylinder head screws, the cylinder head 1 is fastened to the cylinder housing on the side of the crankcase. On both sides of the supporting columns 17, break-throughs 18, 19 are provided in the supporting walls 16, via which the individual sections, on the side of the combustion chamber, of the water space 8 are connected with one another in longitudinal direction.

For the reinforcing of the bottom sections of the cylinder head bottom 2, on the side of the combustion chamber, the cylinder head ceiling 7 is strengthened by a longitudinal rib 20 that, in the central longitudinal plane of the cylinder head 1 is arranged so that its narrow side 21 is arranged to be standing on edge and extends over the whole length of the cylinder head. As can be seen from the embodiment according to FIG. 4, the longitudinal rib 20 exhibits a thickness substantially greater than that of the remaining ceiling sections of ceiling 7. This increased thickness contributes to the improved rigidity and reinforcement of cylinder head 1. Both chambers 14 located in the course of the longitudinal rib 20 and the supporting walls 16 are inter-connected with the longitudinal rib. In addition, the bottom sections on the side of the combustion chamber are supported by special rib webs 22 in the area of the supporting walls 16 at the longitudinal rib. The rib webs 22 that in this case extend longitudinally in the longitudinal medium plane of the cylinder head 1 together with the part of the supporting walls 16 extending in this section form a cross-rib 23. By means of the rib webs 22 overlapping into adjacent bottom sections, on the side of the combustion chamber, a further reinforcing of the whole cylinder head bottom 2 is obtained.

The cylinder head ceiling 7 in transverse direction is arranged so that it is inclined by an angle with respect to the cylinder head bottom 2. The angle in this case corresponds to the sloping angle of the internal-combustion engine when installed in a vehicle. By means of this inclining of the cylinder head ceiling 7 against the inclined position of the engine, it achieves in the installed condition an approximately horizontal position. This position prevents an excessive formation of puddles of lubricating oil coming out of the bearing points of the camshafts.

By means of the longitudinal rib 20, the cylinder head ceiling 7 is divided into two ceiling sections 24 and 25. Nevertheless, the cylinder head ceiling 7, on both sides, receives a continuous smooth surface. The ceiling sections 24 and 25, are staggered with respect to one another along the height of the longitudinal rib 20 in vertical direction of the cylinder head 1. As a result, the cylinder head ceiling 7 exhibits a Z-shaped course, in which case the ceiling section 24, on the left side, forms the lower wall part that slopes down from the exterior wall 4 to the longitudinal rib 20 and interconnects with the rib approximately at the level of the lower narrow side 21. Consequently, the right ceiling section 25 forms the wall section that is located on top that extends so that it is staggered in parallel to the ceiling section 24 from the upper side of the rib to the right exterior wall 5.

Figure 2:
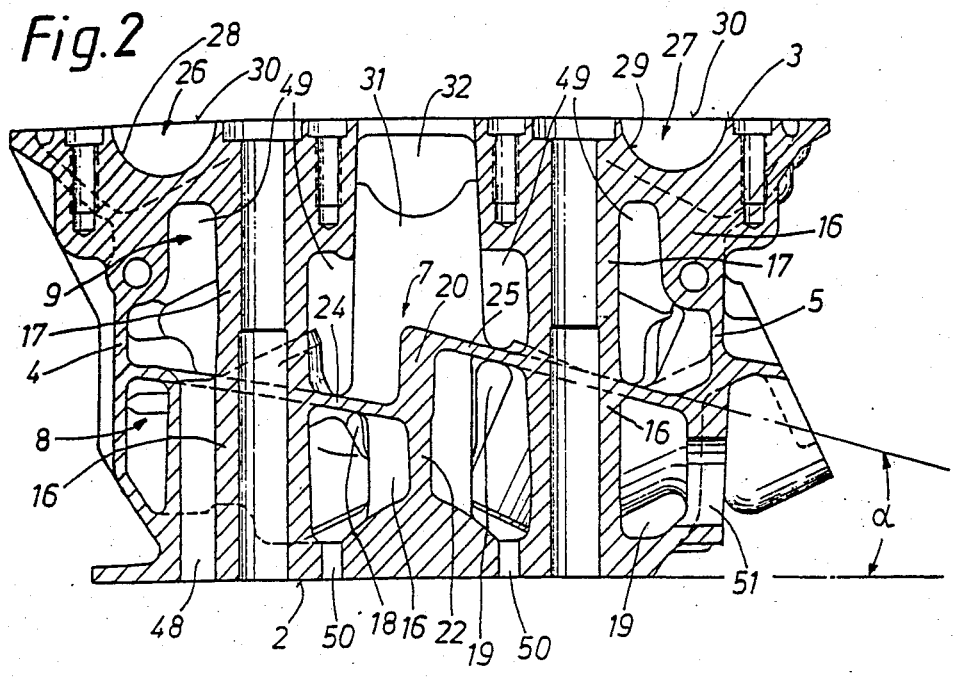
FIG. 2 is a cross-sectional view along Line II—II of the cylinder head of FIG. 1.
Figure 3:
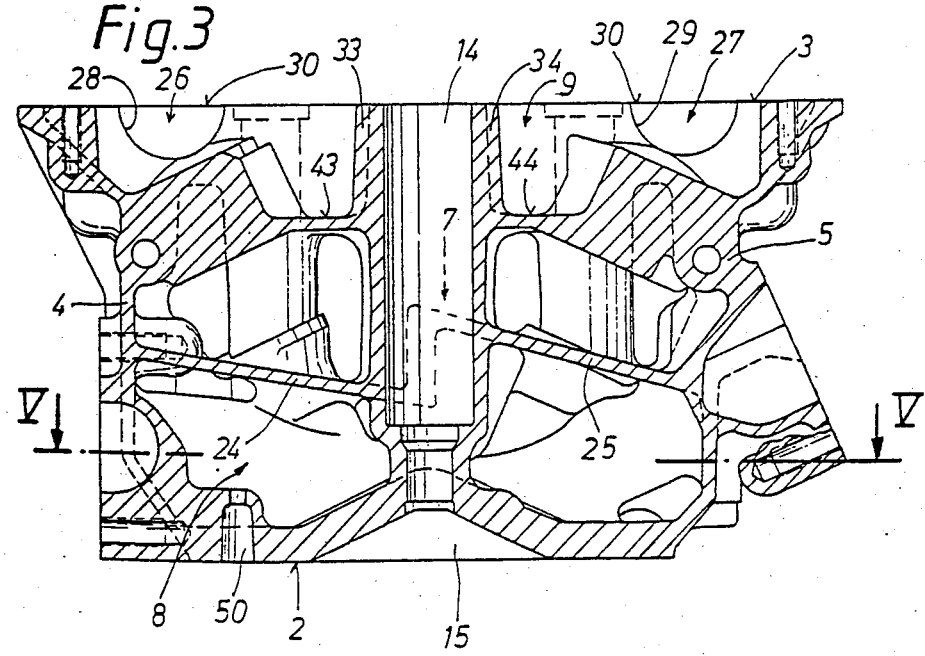
FIG. 3 is a cross-sectional view along Line III—III of the cylinder head of FIG. 1.
Figure 4:
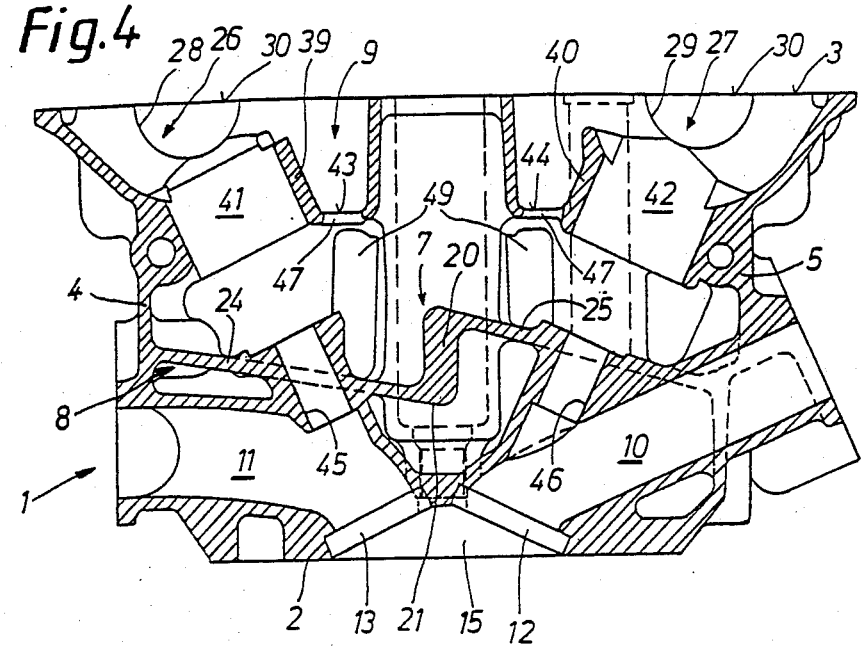
FIG. 4 is a cross-sectional view along Line IV—IV of the cylinder head of FIG. 1.
Figure 5:
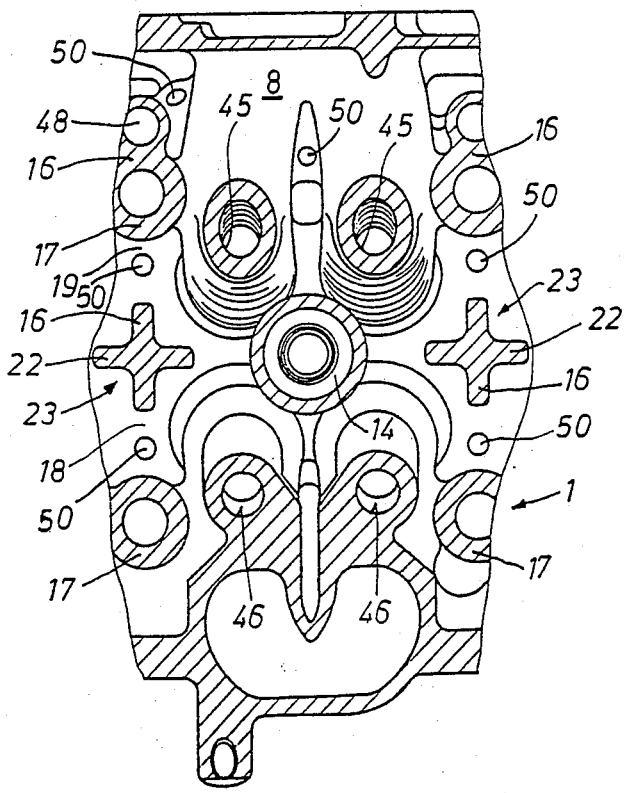
FIG. 5 is a horizontal sectional view through the cylinder head of Figure III according to Line V—V.

As shown by FIGS. 2 to 4, the exterior walls 4 and 5 in the upper area of the control space 9 have a course that is sloping toward the outside resulting in a control space 9 that is approximately V-shaped.

In the angular spaces that develop as a result of the diagonally extending wall parts, bearing seats 26 and 27 are provided for the bearing installation of the two camshafts arranged in the cylinder head. The bearing seats are developed to be divided and consist of lower bearing seat shells 28 and 29 cast onto the lateral exterior walls 4 and 5 and of bearing seat covers that can be screwed together with them and are not shown in the drawing. The dividing plane 30 between the bearing seat cover and shell 28, 29 in this case is at the level of the cover-separating plane 3. In order to achieve a camshaft bearing arrangement that is especially rigid, the individual bearing seat shells 28, 29 are in each case arranged in the transverse planes of the cylinder head 1 extending through the supporting walls 16. In addition, the bearing seat shells 28 and 29 that in each case are located opposite one another in a transverse plane are connected with the supporting columns 17 arranged in the same transverse plane and these are connected with one another via a transverse connecting web 31 projecting in upward direction from the cylinder head ceiling 7. By means of this mutual connection of the lateral bearing seat shells 28, 29 via the supporting columns 17 and the transverse connecting webs 31, a transverse interconnecting structure is created that extends in the transverse plane of the supporting walls 16, said structure contributing to the reinforcements of the cylinder head in the transverse direction. Since in addition, the structure, via the supporting columns 17 as well as the transverse connecting webs 31 are cast onto the cylinder head ceiling 7, a favorable distribution is obtained of the tension forces and gas forces affecting the cylinder head.

Between the supporting columns 17, a clearance 32 remains that extends approximately symmetrically to the longitudinal center line over the whole length of the cylinder head 1 and from the cover-separating plane 3 to the cylinder head ceiling 7. The clearance 32 is interrupted only by the transverse connecting webs 31 projecting into it and the chambers 14. In order to achieve a firm connection of the chambers 14, that are otherwise arranged in the control space 9 to be self-supporting, with the interconnecting structure or supporting columns 17, the lateral interconnecting structure sections 35, 36 projecting toward the clearance 32 and the chambers 14 are connected in each case at one longitudinally directed rib 33, 34. The ribs 33, 34 that in this case are developed to be thin-walled extend, as the lateral delimitation of the clearance 32, over the whole length of the cylinder head 1. The ribs 33 and 34, with the interconnecting structure, form a crossconnection reinforcing the control space 9, said crossconnection, via the transverse connecting webs 31, the chambers 14 and the supporting columns 17, having a connection with the cylinder head ceiling 7 and the cylinder head bottom 2 which also results in a favorable distribution of the gas and tension forces introduced into the cylinder head 1.

In the control space sections 37 and 38 located between adjacent bearing seats 26 and 27 of a camshaft, two cylinder bores 41 and 42 are provided in each case that are located next to one another in longitudinal direction in housing projections 39, 40, for the receiving of the valve tappet cups. In this case, the housing projections 39 are shaped onto the exterior wall 4, the adjacent bearing seats 26 and, via one boat-shaped intermediate bottom 43, to the rib 33. In the same way, the housing projections 40 are connected to the exterior wall 5, the bearing seats 27 and via the boat-shaped intermediate bottom 44, to the rib 34. Also, in the ceiling sections 24 and 25 guide bores 45 46 are provided in alignment to the cylinder bores 41, 42, for the valves to be placed in the cylinder head. The longitudinal center lines of the bores 39, 40 and 43, 44, in this case, extend so that they are inclined with respect to the vertical axis of the cylinder head resulting in a V-shaped arrangement of the valves in the cylinder head 1.

In the intermediate bottoms 43, 44, openings 47 are provided via which lubricating oil coming out of the camshaft bearings is directed into the area of the control space 9 located underneath and from there, via return flow ducts 48, into the crankcase. The return flow ducts 48, in this case, are located in the transition area between the exterior wall 4 and the ceiling section 24. So that the lubricating oil can distribute in the control space 9 in longitudinal direction in an unhindered way, corresponding break-throughs 49 are, provided in the interconnecting structure.

The feeding of the cooling water into the cooling water space 8 takes place via inlet openings 50 in the cylinder head bottom 2. From there, the cooling water distributes over the whole cooling water space 8 and from there is discharged via outlet openings 51. Because of the fact that the return flow ducts 48 and the outlet openings 51 are arranged separately at different sides of the cylinder head housing, cooling water and lubricating oil flow in different directions with respect to one another, in which case the cooling water in the water space 8 flows upwards at the "step" formed by the longitudinal rib 20 and the lubricating oil in the control space 9 flows downward via the "step". By means of these flow conditions, especially backpressures of lubricating oil or vapor bubbles at the longitudinal rib 20 are prevented.

By means of a corresponding separation of the cylinder head 1 into a camshaft housing and a cooling water housing, the manufacturing of the whole cylinder head housing can be simplified. The separating of the two housing parts in this case takes place closely below the intermediate bottom 43, 44 and of the housing projections 39 and 40. In the case of this divided cylinder head construction, the otherwise costly oil core is not required. In addition, better access is achieved for the deburring of the cylinder head bores 41, 42 as well as of the oil return flow ducts 48.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. A liquid-coolable cylinder head for a multi-cylinder internal-combustion engine having a cooling water space formed by lateral exterior walls, a cylinder head bottom and a cylinder head ceiling, said cylinder head having a control space above said cooling water space formed by the cylinder head ceiling, the exterior walls and a cover-separating plane, said cylinder head including tube-shaped chamber means for a spark plug or injection nozzle extending axially through the cooling water space, said cylinder head having transverse supporting walls extending inside the cooling water space from the cylinder head bottom to the cylinder head ceiling, comprising:

longitudinal rib means connected to the cylinder head ceiling, said rib means extending substantially over the length of the cylinder head, said longitudinal rib means being connected to the tube-shaped chamber means and the supporting walls, and longitudinally extending rib web means at the cylinder head bottom connected to the supporting walls, said longitudinal rib means and said longitudinally extending rib web means combining to reinforce said cylinder head.

2. A cylinder head according to claim 1, including valve ducts extending through said cooling water space from mouth openings in the cylinder head bottom to the lateral exterior walls.

3. A cylinder head according to claim 1, wherein said supporting walls are provided with molded in supporting columns having bores for receiving cylinder head screws.

4. A cylinder head according to claim 3, wherein said supporting walls are provided with break-throughs on both sides of the supporting columns.

5. A cylinder head according to claim 1, wherein said cylinder head ceiling comprises first and second longitudinally extending ceiling sections and said longitudinal rib means includes upper and lower connecting portions, said first ceiling section being connected to said rib means at said lower connecting portion and said second ceiling section being connected with said rib means at said upper connecting portion.

6. A cylinder head according to claim 5, wherein said first ceiling section slopes downward from a first exterior wall toward said lower connecting portion and wherein said second ceiling section slopes downwardly from said upper connecting portion to a second exterior wall.

7. A cylinder head according to claim 6, wherein said first and second ceiling sections exhibit approximately the same slope.

8. A cylinder head according to claim 5, wherein the longitudinal rib means exhibits a thickness substantially greater than the thickness of other ceiling portions.

9. A cylinder head according to claim 5, wherein the longitudinal rib means exhibits a thickness substantially greater than the thickness of said first and second ceiling sections.

10. A cylinder head according to claim 1, wherein said longitudinal rib means extends along a central longitudinal plane of said cylinder head.

11. A cylinder head according to claim 1, wherein said cylinder head ceiling is diagonally disposed at a predetermined angle relative to said cylinder head bottom, said predetermined angle being selected so that said cylinder head ceiling exhibits a substantially horizontal orientation when said internal-combustion engine is an installed position.

12. A cylinder head according to claim 1, having valves diagonally arranged in both a first row on one side of a central longitudinal plane of said cylinder head and a second row on another side of said central longitudinal plane, including a cam shaft located above each said valve row, said cam shafts being disposed in bearing seats of said control space, said bearing seats being arranged in the plane of said transverse supporting walls.

13. A cylinder head according to claim 12, wherein said bearing seats comprise bearings seat shells in the cylinder head, said bearing seat shells being engageable with bearing seat cover means, said bearing seat cover means and said bearing seat shelves being separated by a dividing plane, said dividing plane being coplanar with said cover-separating plane.

14. A cylinder head according to claim 13, wherein said supporting walls are provided with supporting column means having bores for receiving of cylinder head screws, and wherein transverse connecting webs are connected with said supporting column means for the purpose of providing a transverse interconnecting structure.

15. A cylinder head according to claim 14, wherein said transverse interconnecting structure is reenforced in the area of said cover-separating plane by at least one rib extending in a direction parallel to the longitudinal axis of the cylinder, said at least one rib being connected with said tube-shaped chamber.

16. A cylinder head according to claim 1, including intermediate bottom means and housing projection means, said cooling water space and said control space being separated by said cylinder head ceiling, said cylinder head ceiling being disposed closely below said intermediate bottom and said housing projections.

* * * * *